US010452766B2

(12) United States Patent
Amoli et al.

(10) Patent No.: US 10,452,766 B2
(45) Date of Patent: Oct. 22, 2019

(54) CREATING SHARED CONTENT IN A DEVICE-INDEPENDENT CONTENT EDITOR USING A NATIVE OPERATING SYSTEM INTERFACE

(71) Applicant: Box, Inc., Los Altos, CA (US)

(72) Inventors: Sahil Amoli, San Francisco, CA (US); Brian James Emerick, Mountain View, CA (US); Shuo Liu, Palo Alto, CA (US); Naeim Semsarilar, San Carlos, CA (US); Rico Sebastian Yao, San Jose, CA (US)

(73) Assignee: Box, Inc., Redwood City, CA (US)

( * ) Notice: Subject to any disclaimer, the term of this patent is extended or adjusted under 35 U.S.C. 154(b) by 920 days.

(21) Appl. No.: 14/952,601

(22) Filed: Nov. 25, 2015

(65) Prior Publication Data
US 2017/0147545 A1    May 25, 2017

(51) Int. Cl.
*G06F 17/24*     (2006.01)
*G06Q 10/10*    (2012.01)
*H04L 29/08*     (2006.01)

(52) U.S. Cl.
CPC .............. *G06F 17/24* (2013.01); *G06Q 10/10* (2013.01); *G06Q 10/101* (2013.01); *H04L 67/1097* (2013.01)

(58) Field of Classification Search
CPC ........................................................ G06F 17/24
See application file for complete search history.

(56) References Cited

U.S. PATENT DOCUMENTS

| | | | |
|---|---|---|---|
| 2007/0038934 A1* | 2/2007 | Fellman | G06F 3/0481 715/700 |
| 2008/0098289 A1* | 4/2008 | Williams | G06F 9/451 715/200 |
| 2011/0047484 A1* | 2/2011 | Mount | G06Q 10/10 715/753 |

(Continued)

OTHER PUBLICATIONS

Chell, Dominic, et al. The mobile application Hacker's handbook. John Wiley & Sons, 2015, p. 733.

(Continued)

*Primary Examiner* — Scott T Baderman
*Assistant Examiner* — Mario M Velez-Lopez
(74) *Attorney, Agent, or Firm* — Vista IP Law Group, LLP

(57) ABSTRACT

A server in a cloud-based environment interfaces with storage devices that store shared content. A user retrieves a document editing application from the server. The document editing application comprises a set of native operating system application code, a web content viewer, and a native operating system interface, which are configured to facilitate a transfer of one or more objects between the native operating system application code and the web content viewer. In response to a user upload request, the server generates an object placeholder in an editable document. Using the native operating system application code, objects can be selected for incorporation into the editable document. Shared access to the editable document and shared access to uploaded objects are provided by the server by posting links to locations in the storage devices. The document editing application replaces the object placeholder with a link to the object as stored by the server.

20 Claims, 12 Drawing Sheets

(56) References Cited

U.S. PATENT DOCUMENTS

2012/0023407 A1\* 1/2012 Taylor ................. G06F 3/04842
                                                    715/731
2015/0082196 A1   3/2015 Berger et al.
2015/0248540 A1\* 9/2015 Lovejoy ................. G06F 19/00
                                                    706/47

OTHER PUBLICATIONS

Still, David. "Box Notes Is Now Mobile | Box Blog". Blog.Box. Com, Jun. 22, 2014, https://blog.box.com/blog/box-notes-is-now-mobile/. Accessed Jul. 11, 2018.

Ramachandra, Thejaswini. "Converting Your Existing Web Applications to Mobile Apps Using IBM Worklight (IBM Worklight)". Ibm.Com, Dec. 19, 2012, https://www.ibm.com/developerworks/community/blogs/worklight/entry/converting_your_existing_web_applications_to_mobile_apps_using_ibm_worklight?lang=en. Accessed Jul. 11, 2018.

\* cited by examiner

US 10,452,766 B2

CREATING SHARED CONTENT IN A DEVICE-INDEPENDENT CONTENT EDITOR USING A NATIVE OPERATING SYSTEM INTERFACE

FIELD

This disclosure relates to managing shared content in a cloud-based service platform, and more particularly to techniques for creating shared content in a device-independent content editor using a native operating system interface.

BACKGROUND

The proliferation of cloud based services and systems continues to increase. Specifically, cloud-based content management services and platforms have impacted the way personal and corporate information objects (e.g., files, images, videos, etc.) are stored, and has also impacted the way such personal and corporate content is shared and managed. One benefit of using such cloud-based platforms is the ability to securely share content among trusted collaborators on a variety of user devices, such as mobile phones, tablets, laptop computers, desktop computers, and/or other devices. Certain cloud-based shared content management platforms might further provide document creation and editing applications (apps) for such user devices so the collaborators can create and/or edit documents within the cloud-based system for real-time, multi-environment sharing.

Unfortunately, some applications (e.g., web applications) can be limited at least in their ability to access the native resources availed by the user device operating system to create content that can be shared among collaborators in real time. For example, a collaborator might want to use the native camera functionality to insert a picture in a document being edited in a web-based content editor, and to have the picture and document available in real time for viewing and/or editing by another authorized collaborator using a different device and/or accessing from a different environment.

On some platforms, a browser may have limited access to the native resources availed by the user device operating system to create content, however the user experience (e.g., availability of screen devices, consistency with platform-native user interfaces, availability of pickers, selectors, etc.) offered by browsers is deficient, and native operating system access is needed so as to provide a suitable (e.g., familiar or expeditious) user experience.

What is needed is a technique or techniques to improve over legacy approaches.

SUMMARY

The present disclosure provides a detailed description of techniques used in systems, methods, and in computer program products for creating shared content in a device-independent content editor using a native operating system interface.

A server in a cloud-based environment interfaces with storage devices that store shared content accessible by users using respective user devices. A user retrieves a document editing application from the server. The document editing application comprises a set of native operating system application code, a web content viewer, and a native operating system interface, which are configured to facilitate a transfer of one or more objects between the native operating system application code and the web content viewer. In response to a user upload request, the server generates an object placeholder in an editable document. Using the native operating system application code, objects can be selected for incorporation into the editable document. Shared access to the editable document and shared access to uploaded objects are provided by the server by posting links to locations in the storage devices. The document editing application replaces the object placeholder with a link to the object as stored by the server.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
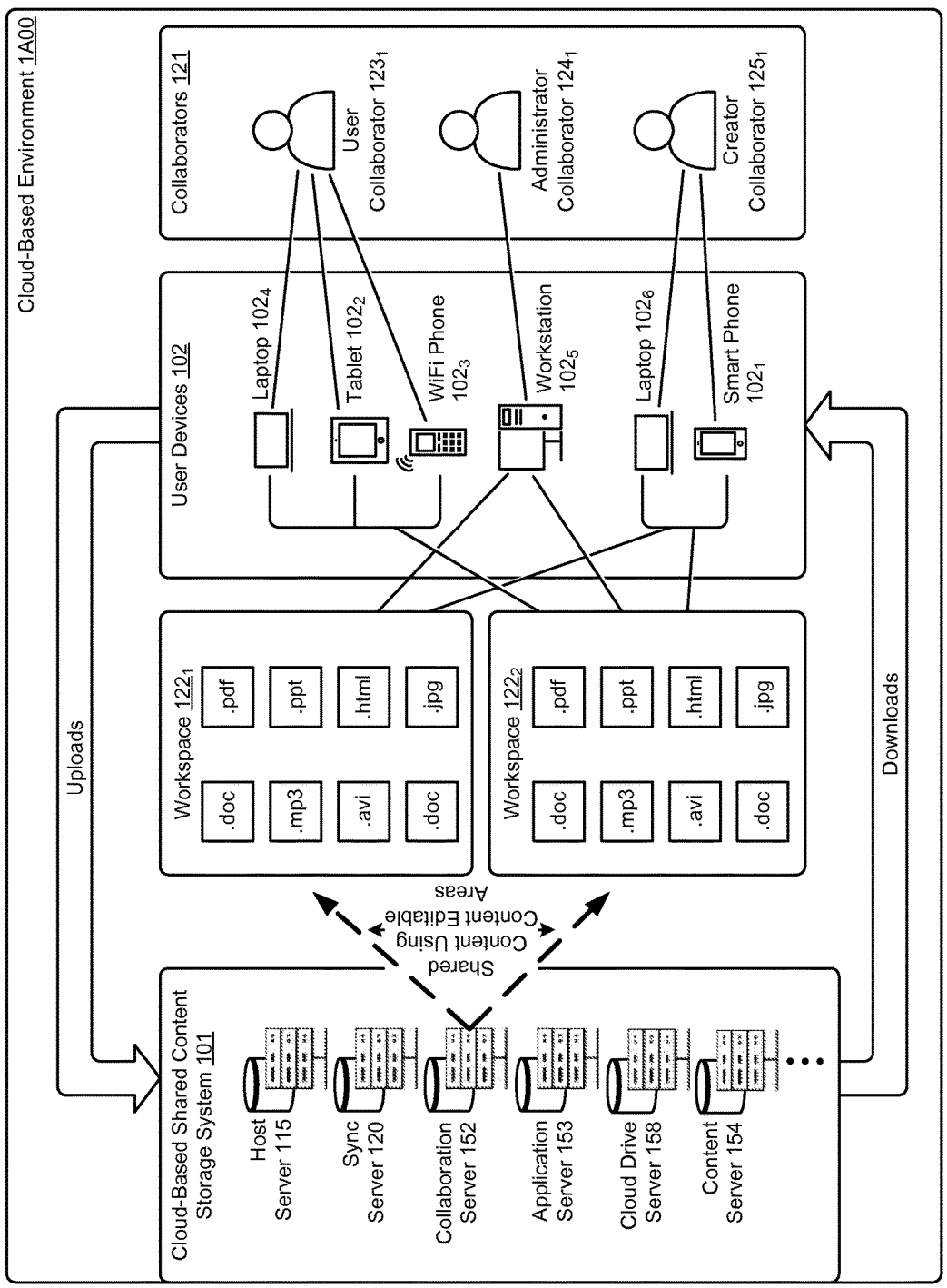
FIG. 1A presents a cloud-based environment including a cloud-based shared content management platform for creating shared content in a device-independent content editor using a native operating system interface, according to an embodiment.

Some embodiments of the present disclosure address the problem of delivering a device-independent content editor that is capable of using native resources to create content that can be shared among collaborators in real time and some embodiments are directed to approaches for implementing a protocol for enabling communication between a web-based content editor and certain native operating system application code for performing various collaboration operations, such as using a native resource to insert a content object into an editable document in the web-based content editor that can be shared among collaborators in real time.

More particularly, disclosed herein and in the accompanying figures are exemplary environments, systems, methods, and computer program products for creating shared content in a device-independent content editor using a native operating system interface.

Overview

Disclosed herein are techniques where content-creation applications implement or use a device-independent content editor such that the applications can be compatible with multiple user device environments. For example, a document editing application for mobile devices might use the contentEditable HTML attribute with a web content viewer (e.g., iOS UIWebView) to form a web-based rich text and/or rich media editing surface compatible with iOS, Android, and/or other mobile device platforms and/or operating systems. Such approaches eliminate the need for the application provider (e.g., the cloud-based shared content management platform) to develop and maintain the numerous lines (e.g., 100,000 or more) of code required to replicate an editing capability (e.g., equivalent to the HTML contentEditable capability) for each mobile device operating system. Disclosed herein is a system and protocol for enabling communication between a content editor of a document editing application operating on a user device, and certain application code native to the operating system (OS) of the user device, to perform various operations, such as using a native resource (e.g., mobile phone camera) to insert a content object (e.g., photograph) into a created document (e.g., inspection form) in the content editor. In one or more embodiments, a native operating system interface can implement such communication by dynamically creating a container (e.g., iFrame) in a web-based content editor for receiving commands and associated parameters to be processed by the native OS application code. In one or more embodiments, a native operating system interface can initiate and/or respond to communication that originates from or passes through or to the native operating system, a web-based content editor, and components of a cloud-based storage system. In some cases the native operating system interface can exposes a JavaScript object that the native OS application code can use to issue or otherwise communicate commands and associated parameters to the web-based content editor. The commands and associated parameters can invoke operations related to various actions associated with editing and/or sharing the created document, such as: authenticating the user and/or user device, uploading objects (e.g., (e.g., photos, text files, images, videos, sounds, annotations, CAD files, etc.) to a cloud-based storage system, controlling the editing surface (e.g., HTML contentEditable container), modifying the user clipboard, accessing native resources, providing user interface screen devices, handling error conditions and resuming or restoring after error conditions, storing large object, initiating network operations (e.g., for uploads), and/or other actions. The created document and/or certain portions (e.g., inserted objects) of the created document can be stored and managed by a cloud-based shared content management platform for sharing among collaborators in real time.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A presents a cloud-based environment 1A00 including a cloud-based shared content management platform for creating shared content in a device-independent content editor using a native operating system interface. As an option, one or more variations of cloud-based environment 1A00 or any aspect thereof may be implemented in the context of the architecture and functionality of the embodiments described herein. Also, the cloud-based environment 1A00 or any aspect thereof may be implemented in any environment.

As shown, certain users (e.g., collaborators 121) having various collaboration roles (e.g., user collaborator 123$_1$, administrator collaborator 124$_1$, creator collaborator 125$_1$, etc.) can use one or more instances of user devices 102 to interact with one or more workspaces (e.g., workspace $122_1$, workspace $122_2$, etc.) within the cloud-based environment 1A00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 120, a collaboration server 152, an application server 153, a cloud drive server 158, a content server 154, etc.

Any of the users can access shared content from the cloud-based shared content storage system 101 without the additional process of manually downloading and storing a file locally on an instance of the user devices 102 (e.g., smart phone $102_1$, tablet $102_2$, WiFi phone $102_3$, laptop $102_4$, workstation $102_5$, laptop $102_6$, etc.). For example, a content object (e.g., computer file, text document, audio file, video file, image file, etc.) created by the creator collaborator $125_1$ might be viewed by the user collaborator $123_1$, yet without informing the user collaborator $123_1$ where the file is stored or without prompting the user collaborator $123_1$ for a directory in which to access the file. Such a facility streamlines the frequently repeated sharing and collaboration processes.

Functions and techniques performed by the cloud-based shared content storage system 101 and/or the client side components (e.g., user devices 102, a sync client on an instance of the user devices 102, etc.) are described herein with further details and with reference to several examples.

Figure 1B:
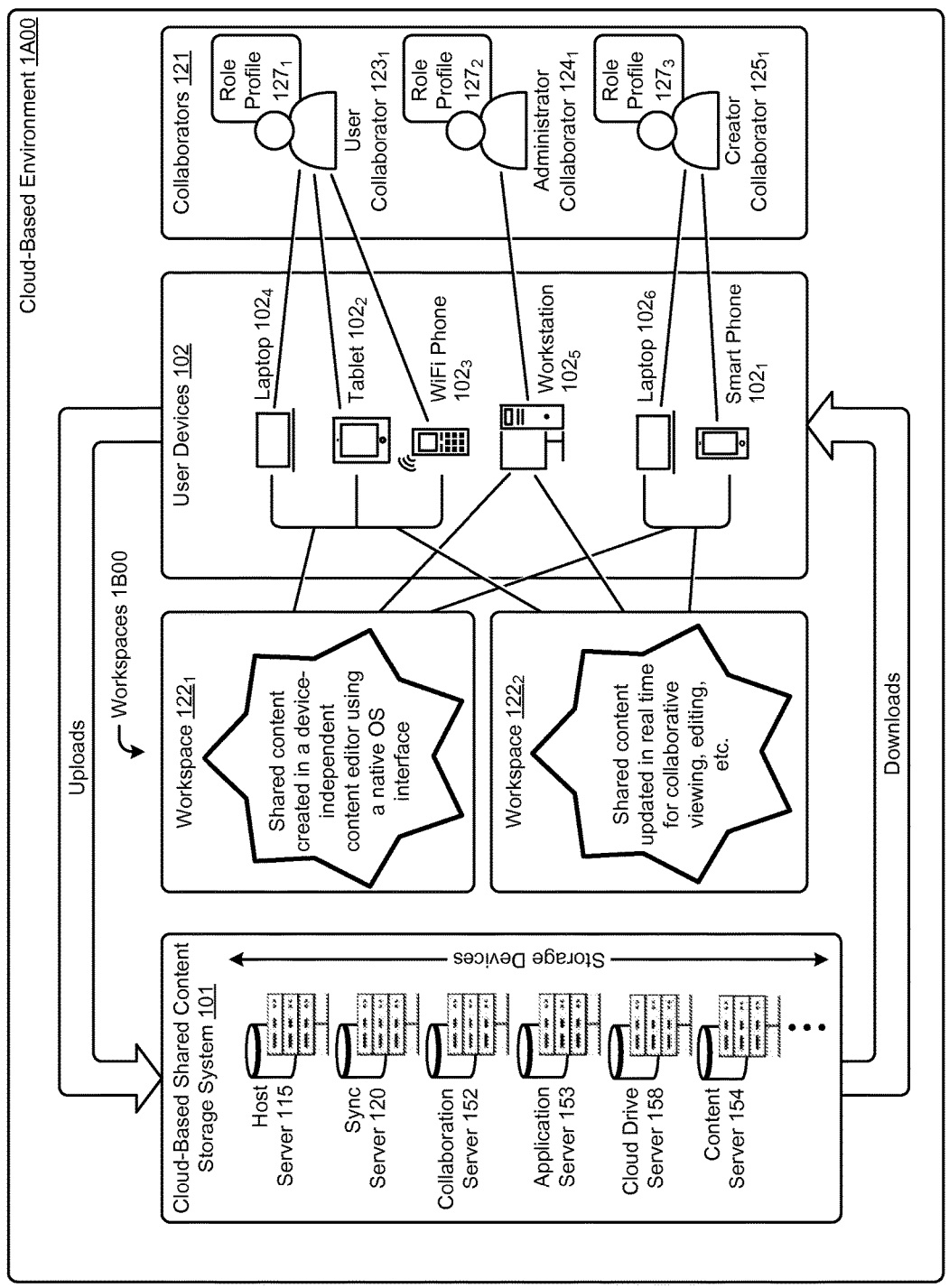
FIG. 1B presents a schematic view of workspaces that are populated with dynamically-created shared content that is generated in a device-independent content editor using a native operating system interface, according to an embodiment.

FIG. 1B presents a schematic view of workspaces 1B00 that are populated with dynamically-created shared content that is generated in a device-independent content editor using a native operating system interface. As an option, one or more variations of workspaces 1B00 or any aspect thereof may be implemented in the context of the architecture and functionality of the embodiments described herein. Also, the workspaces 1B00 or any aspect thereof may be implemented in any environment.

The embodiment shown in FIG. 1B is merely one example implementation of the cloud-based environment 1A00 where two or more of the collaborators 121 share a content object (e.g., computer file, electronic document, image, etc.), and where each collaborator has a certain access (e.g., for viewing, editing, downloading, etc.) to the shared object in a respective collaborator-specific workspace (e.g., workspace $122_1$, workspace $122_2$, etc.). Moreover, a collaborator (e.g., the user collaborator $123_1$, the administrator collaborator $124_1$, and the creator collaborator $125_1$) can have an associated role profile (e.g., a role profile $127_1$, a role profile $127_2$, and a role profile $127_3$, respectively). Such an associated role profile can comprise certain attributes such as user information (e.g., user ID, device ID, etc.) and/or user workspace metadata (e.g., file ID, etc.) and/or access permissions and/or role descriptions. One or more roles can be associated with one or more access configurations, and such roles and/or access configurations can be used in determining rules pertaining to how users share documents. Moreover, such roles and/or access configurations can be used in determining how users can view, preview, edit, download, sync, print, and otherwise access shared documents.

The embodiment shown in FIG. 1B indicates certain operations corresponding to creating shared content in a device-independent content editor using a native operating system interface. Specifically, shared content created in a device-independent content editor using a native OS interface is shown within workspace $122_1$. Strictly as one example, the shared content in workspace $122_1$ might be a rich-media inspection document created by the creator collaborator $125_1$ on the smart phone $102_1$ that includes a picture taken with the native camera functionality of the user device. Also, shared content updated in real time for collaborative operations (e.g., viewing, editing, etc.) is shown in workspace $122_2$. For example, the user collaborator $123_1$ might be collaborating with the creator collaborator $125_1$ on the inspection document. In this case, the user collaborator $123_1$ can view in real time the picture inserted by the creator collaborator $125_1$. Techniques for creating such shared content in a device-independent content editor using a native operating system interface are described in FIG. 2 and herein.

Figure 2:
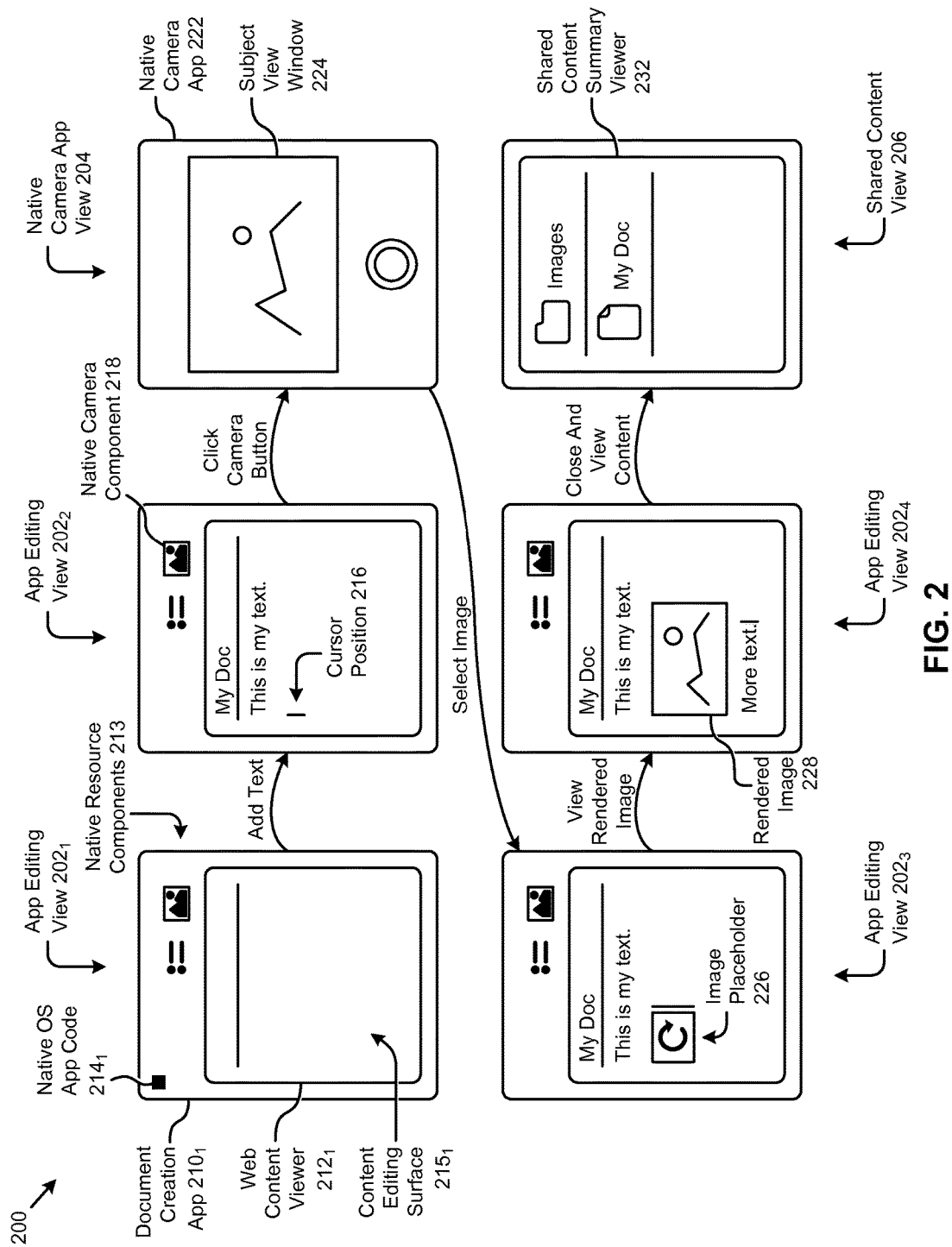
FIG. 2 illustrates an object insertion technique as used in systems that support creating shared content in a device-independent content editor using a native operating system interface, according to an embodiment.

FIG. 2 illustrates an object insertion technique 200 as used in systems that support creating shared content in a device-independent content editor using a native operating system interface. As an option, one or more variations of object insertion technique 200 or any aspect thereof may be implemented in the context of the architecture and functionality of the embodiments described herein. Also, the object insertion technique 200 or any aspect thereof may be implemented in any environment.

The object insertion technique 200 depicts a sequence of views of a document creation app $210_1$ used by a user (e.g., creator collaborator $125_1$) to create shared content according to the herein disclosed techniques. Specifically, in an app editing view $202_1$, the document creation app $210_1$ is shown to comprise a web content viewer $212_1$ comprising a content editing surface $215_1$. In some cases and/or embodiments, the web content viewer $212_1$ and the content editing surface $215_1$ might comprise a device-independent content editor. For example, the web content viewer $212_1$ might implement an iOS UIWebView (e.g., or WKWebView) object and the content editing surface $215_1$ might be formed by a contentEditable container such that the editable content can be represented in HTML for compatibility across device platforms. The document creation app $210_1$ further comprises a set of native resource components 213 (e.g., a camera button, and a bullet and/or list formatting button) providing an interface to invoke access to certain resources native to the OS (e.g., a camera, and a style control, respectively). In some cases, such native OS resource access can be implemented by certain instances of native OS app code $214_1$ included in the document creation app $210_1$.

As illustrated by the object insertion technique 200, an app editing view $202_2$ might result from certain text being entered by the user into the content editing surface $215_1$. For example, the shown document title and body text might be entered such that the cursor is at a cursor position 216. The user might then want to insert a picture at the cursor position 216. As implemented by the herein disclosed techniques, the user can click the camera button (e.g., native camera component 218) to invoke a native camera app 222 as shown in a native camera app view 204. The user might then use a subject view window 224 to take a photograph and select the resulting image. In some cases, the user might select an existing image. When the image is selected, an image placeholder 226 can be inserted in the content editing surface $215_1$ at the cursor position 216 as shown in an app editing view $202_3$. In one or more embodiments, the image placeholder 226 can be used to identify the intended insertion point of the selected image or representation of the selected image (e.g., a preview image such as a thumbnail) while the image is processed. For example, the image might be uploaded to a cloud-based shared content management system to facilitate collaboration operations associated with the image and/or created document. In such cases, the selected image might not be immediately accessible, rather an image representation (e.g., a preview image, or a lower-resolution image, or a for-placement-only image placeholder) might be presented in the general location where the image is intended to be positioned in the content editing surface.

When the selected image or image representation is accessible, the user can view the rendered image 228 or image representation in an app editing view $202_4$. Further, additional text (e.g., see "More text.") and/or other content can be entered into the content editing surface $215_1$ when the image placeholder 226 is present (e.g., app editing view $202_3$) and/or when the rendered image 228 is present (e.g., app editing view $202_4$). In some cases, the document creation app $210_1$ can be closed by the user to view a summary of the created shared content. Specifically, a document named "My Doc" and a folder named "Images" (e.g., comprising the stored copy of the rendered image 228) can be viewed in a shared content summary viewer 232 in a shared content view 206. According to the herein disclosed techniques, such created content can be shared in real time with authorized collaborators.

In some cases, the foregoing object insertion technique 200 can require communication among the web content viewer $212_1$, the content editing surface $215_1$, and/or the native OS app code $214_1$. For example, the cursor position 216 might need to be communicated by the web content viewer $212_1$ to the native camera app 222. Further, the object insertion technique 200 might require interaction with a cloud-based shared content management platform to allow multiple authorized collaborators on various user devices to access (e.g., view, edit, download, etc.) the created content in real time. For example, the cloud-based system might interact with the document creation app $210_1$ to indicate when the selected image is accessible. Such communications and interactions can be implemented using the techniques disclosed in the following and herein.

Figure 3A:
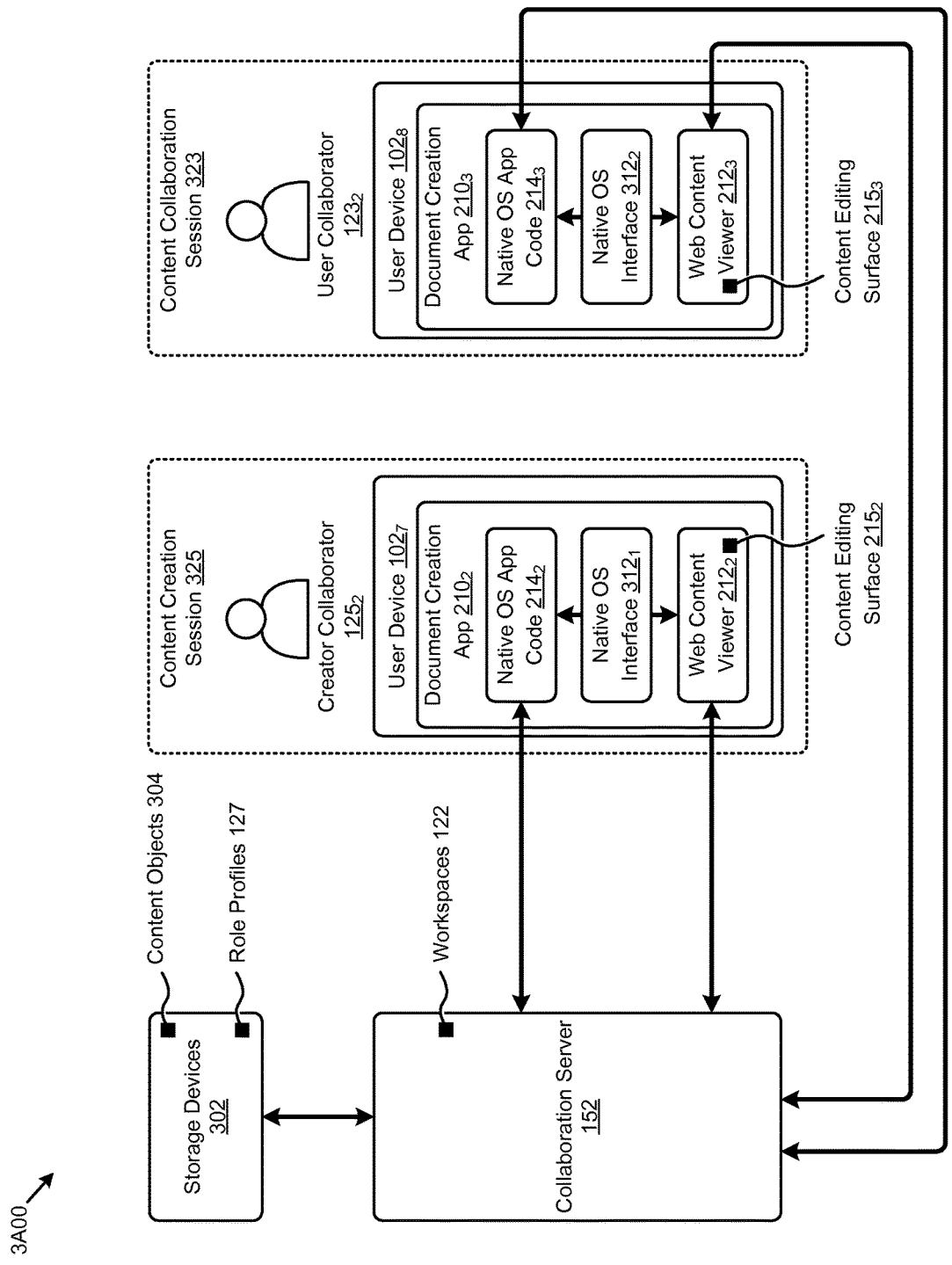
FIG. 3A presents a data flow to implement techniques for creating shared content in a device-independent content editor using a native operating system interface, according to an embodiment.

FIG. 3A presents a data flow 3A00 to implement techniques for creating shared content in a device-independent content editor using a native operating system interface. As an option, one or more variations of data flow 3A00 or any aspect thereof may be implemented in the context of the architecture and functionality of the embodiments described herein. Also, the data flow 3A00 or any aspect thereof may be implemented in any environment.

The shown data flow depicts multiple users (e.g., creator collaborator $125_2$ and user collaborator $123_2$) collaborating on shared content created in a device-independent content editor using a native operating system interface according to the herein disclosed techniques. Such collaboration on shared content can take place concurrently with other accesses in multiple concurrent sessions involving multiple concurrently sharing users. Dynamically establishing user content access provisioning of the shared content can be performed by the collaboration server 152. Further, the collaboration server 152 can use certain instances of storage devices 302 to provide efficient access to the set of content objects 304 being shared. For example, the collaboration server 152 might manipulate representations (e.g., views, previews, links, etc.) of the content objects 304, rather than manipulate the source data comprising the content objects 304, when providing access to collaborators using respective instances of workspaces 122. In some cases, such access can be provisioned to the collaborators by the collaboration server 152 based on the role profiles 127 stored on the storage devices 302. In some embodiments, the collaboration server 152 and the storage devices 302 can be included in a cloud-based shared content management platform that can implement creating shared content in a device-independent content editor using a native operating system interface Specifically, for example, a creator collaborator $125_2$ and a user collaborator $123_2$ might have instances of the document creation app $210_1$ described in FIG. 2 (e.g., document creation app $210_2$ and document creation app $210_3$, respectively) operating on their respective user devices (e.g., user device $102_7$ and user device $102_8$, respectively). As shown, each instance of the document creation app can comprise respective instances of native OS application code (e.g., native OS app code $214_2$ and native OS app code $214_3$) and a respective web content viewer (e.g., web content viewer $212_2$ and web content viewer $212_3$). In one or more embodiments, the web content viewer $212_2$ and the web content viewer $212_3$ can also comprise a content editing surface $215_2$ and a content editing surface $215_3$, respectively. Each instance of the document creation app can further comprise a respective native OS interface (e.g., native OS interface $312_1$ and native OS interface $312_2$) to facilitate communication between the corresponding instances of the native OS app code and the web content viewer, according to the herein disclosed techniques.

As an example, the creator collaborator $125_2$ might invoke a content creation session 325 to create shared content using the object insertion technique 200 earlier described. In this case, the collaboration server 152 might communicate with the native OS app code $214_2$ (e.g., to upload the selected image from the native camera) and communicate with the web content viewer $212_2$ (e.g., to download the content for the rendered image 228) as shown. In some cases, one or more users might want to collaborate with the creator collaborator $125_2$ on the shared content created using the object insertion technique 200. Specifically, for example, the user collaborator $123_2$ might invoke a content collaboration session 323 to perform such collaboration. As shown, the native OS app code $214_3$ and the web content viewer $212_3$ of the document creation app $210_3$ can communicate with the collaboration server 152 to present the shared content to the user collaborator $123_2$. For example, text input by the creator collaborator $125_2$ in the content editing surface $215_2$ can appear in real time in the content editing surface $215_3$ for viewing by the user collaborator $123_2$. Further, a new image inserted by the user collaborator $123_2$ according to the object insertion technique 200 can appear in real time in the web content viewer $212_2$ of the creator collaborator $125_2$.

The native OS interface $312_1$ and native OS interface $312_2$ can be used in implementing the object insertion technique 200 by enabling communication between the web content viewer $212_2$ and the native OS app code $214_2$, and enabling communication between the web content viewer $212_3$ and the native OS app code $214_3$, respectively (e.g., communicating the cursor position 216 to the native camera app 222 in the object insertion technique 200). Further details pertaining to the functionality of instances of the native OS interface are described in FIG. 3B.

Figure 3B:
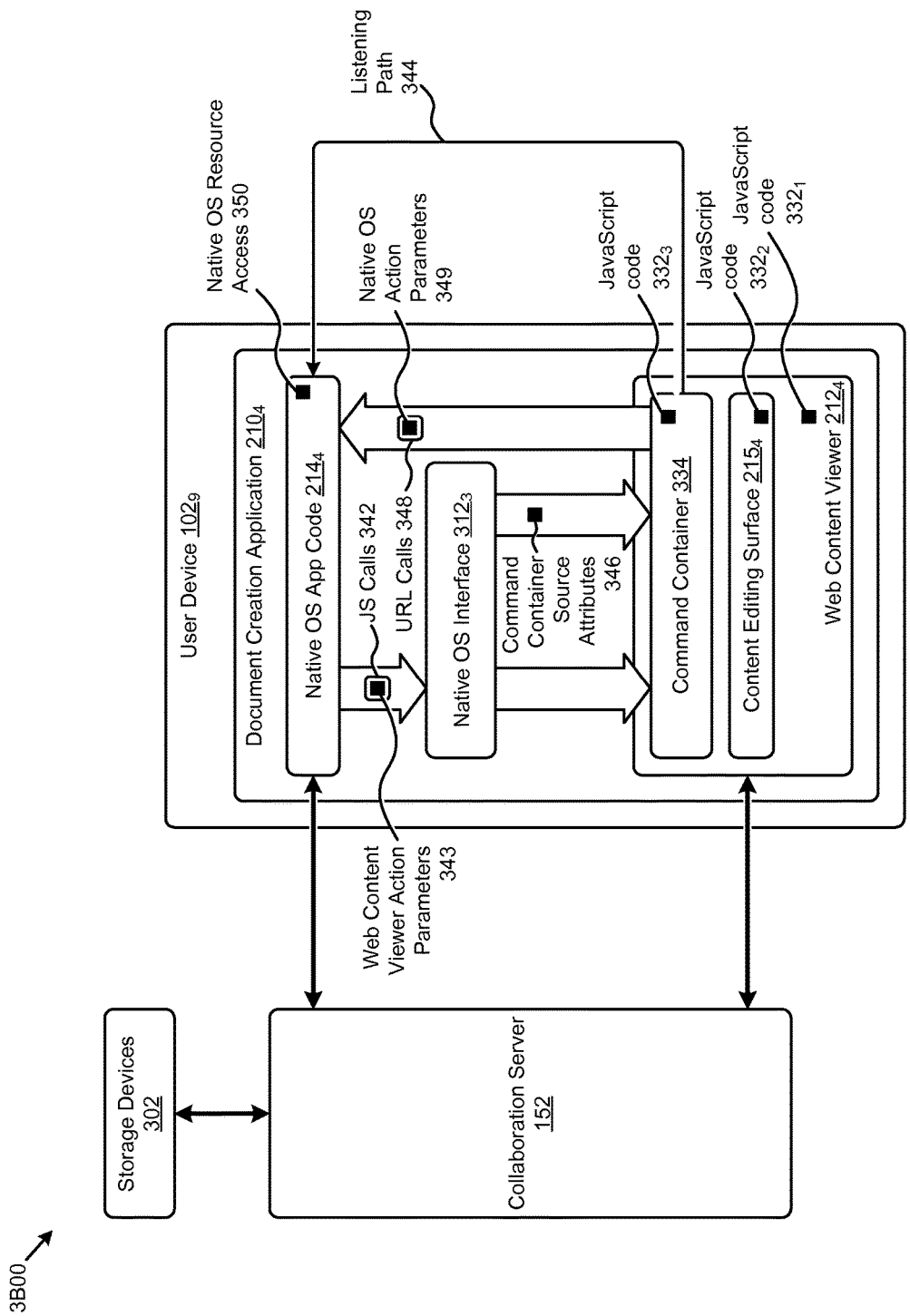
FIG. 3B depicts a subsystem comprising a native operating system interface for creating shared content in a device-independent content editor, according to some embodiments.

FIG. 3B depicts a subsystem 3B00 comprising a native operating system interface for creating shared content in a device-independent content editor. As an option, one or more variations of subsystem 3B00 or any aspect thereof may be implemented in the context of the architecture and functionality of the embodiments described herein. Also, the subsystem 3B00 or any aspect thereof may be implemented in any environment.

As shown, subsystem 3B00 comprises instances of certain components described in the foregoing figures. Specifically, a document creation app $210_4$ is shown operating on a user device $102_9$. In some embodiments, the document creation app $210_4$ can comprise a web content viewer $212_4$, a native OS interface $312_3$, and certain instances of native OS app code $214_4$. In some cases, the native OS app code $214_4$ can provide access to certain resources native to the OS of the user device $102_9$ (e.g., native OS resource access 350). Further, the web content viewer $212_4$ can comprise and/or support various functional modules, such as a content editing surface $215_4$, instances of a command container 334, JavaScript code (e.g., JavaScript code $332_1$, JavaScript code $332_2$, JavaScript code $332_3$), and/or other modules. For example, the content editing surface $215_4$ might be implemented in the web content viewer $212_4$ using the contentEditable HTML attribute to produce a device-independent content editor. Further, any instances of JavaScript code might comprise various JavaScript (JS) functions, objects, and/or other components to perform various operations, such as manipulating the web-based content in the web content viewer $212_4$. The command container 334 might be an embedded HTML element (e.g., an iFrame) comprising content and/or links to content from various sources.

In one or more embodiments, shared content can be created in a device-independent content editor (e.g., web content viewer $212_4$) using the native OS interface $312_3$, according to the herein disclosed techniques. Specifically, such techniques might use the native OS interface $312_3$ to facilitate communication between the web content viewer $212_4$ and the native OS app code $214_4$. More specifically, as shown, the native OS interface $312_3$ might expose a global JS object to the native OS app code $214_4$ for issuing various instances of JS calls 342 comprising a set of web content viewer action parameters 343 for processing by the JavaScript code of the web content viewer $212_4$. For example, the JS calls 342 might reference a platformAdapter global JS object having a call method that is exposed by the native OS interface $312_3$. The web content viewer action parameters 343 included in the JS calls 342 might comprise an action identifier (e.g., set-style, etc.), and/or a string (e.g., JSON string) of key-value pairs (e.g., "styleType":"list", etc.) associated with the action identifier, as shown in Table 1.

TABLE 1

JS Call Examples

| Ref | Example JS Call |
|---|---|
| 1 | platformAdapter.call('set-style', \"{ \"styleType\": \"list\", \"styleValue\": \"bullet\" }\"); |
| 2 | platformAdapter.call('set-style', \"{ \"styleType\": \"indent\" }\"); |
| 3 | platformAdapter.call('set-editor-focus', \"{ \"value\": \"off\" }\"); |
| 4 | platformAdapter.call('set-style', \"{ \"styleType\": \"bold\", \"styleValue\": \"on\" }\"); |
| 5 | platformAdapter.call('set-style', \"{ \"styleType\": \"font-color\", \"styleValue\": \"#fff\" }\"); |

The native OS interface $312_3$ might further be used to facilitate communication from the web content viewer $212_4$ to the native OS app code $214_4$. Specifically, the command container 334 might be configured such that the native OS app code $214_4$ is listening (e.g., see listening path 344) to the contents of the command container 334 for commands intended for the native OS app code $214_4$ (e.g., for native OS resource access 350). In such an embodiment, the content source associated with the command container 334 can be manipulated by the native OS interface $312_3$ using a set of command container source attributes 346. For example, the command container source attributes 346 might comprise information that present certain instances of URL calls 348 comprising a set of native OS action parameters 349 for processing by the native OS app code $214_4$. For example, the URL calls 348 might reference a native-app://URL having an associated query string comprising the native OS action parameters 349. The native OS action parameters 349 included in the URL calls 348 might comprise an action identifier (e.g., editor-ready, etc.), and/or a string of key-value pairs (e.g., styleType=list, etc.) associates with the action identifier, as shown in Table 2.

TABLE 2

URL Call Examples

| Ref | Example URL Call |
|---|---|
| 1 | native-app://style-changed?styleType=list&styleValue=number |
| 2 | native-app://style-changed?styleType=bold&styleValue=on |
| 3 | native-app://style-changed?styleType=font-size&styleValue=16 |
| 4 | native-app://external-link-opened?link=[url encoded value] |
| 5 | native-app://connection-status-changed?value=disconnected |

The subsystem 3B00 presents merely one partitioning. The specific example shown is purely exemplary, and other partitioning is reasonable. An environment supporting such systems, subsystems, and/or partitionings for creating shared content in a device-independent content editor using a native operating system interface is shown in FIG. 4.

Figure 4:
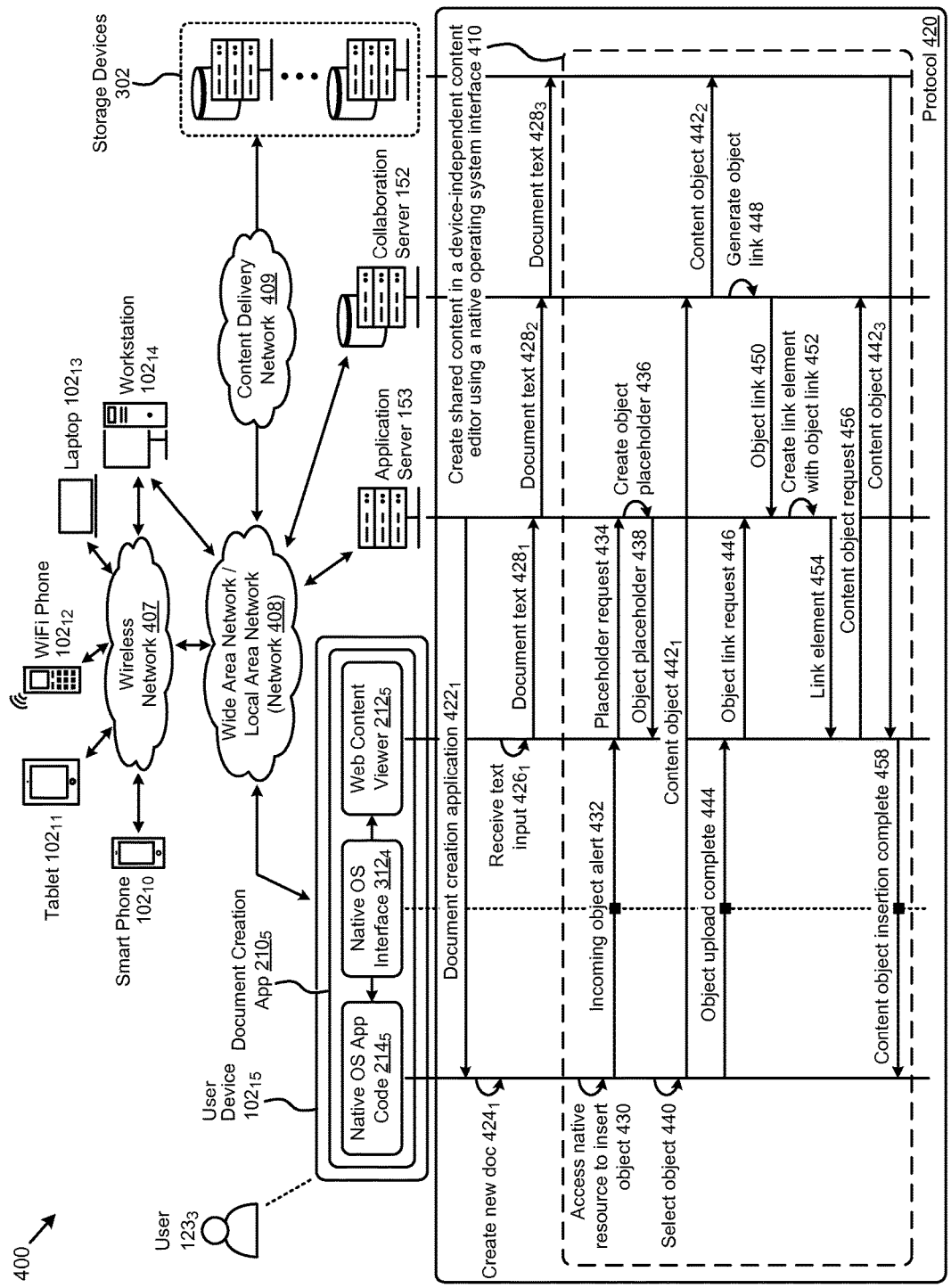
FIG. 4 is an environment that can support embodiments of a protocol for creating shared content in a device-independent content editor using a native operating system interface.

FIG. 4 is an environment 400 that can support embodiments of a protocol for creating shared content in a device-independent content editor using a native operating system interface. As an option, one or more variations of environment 400 or any aspect thereof may be implemented in the context of the architecture and functionality of the embodiments described herein. Also, the environment 400 or any aspect thereof may be implemented in any environment.

As shown in FIG. 4, the environment 400 comprises various computing systems (e.g., servers and devices) interconnected by a wireless network 407, a network 408, and a content delivery network 409. The wireless network 407, the network 408, and the content delivery network 409 can comprise any combination of a wide area network (e.g., WAN), local area network (e.g., LAN), cellular network, wireless LAN (e.g., WLAN), or any such means for enabling communication of computing systems. The wireless network 407, the network 408, and the content delivery network 409 can also collectively be referred to as the Internet. The content delivery network 409 can comprise any combination of a public network and a private network. More specifically, environment 400 comprises at least one instance of the collaboration server 152, at least one instance of the application server 153, and the plurality of storage devices 302. The servers and storage devices shown in environment 400 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 152, the application server 153, and the storage devices 302 can comprise a cloud-based content management platform that provides shared content management and storage services.

The environment 400 further comprises instances of user devices 102 (e.g., user device $102_{15}$) that can represent one of a variety of other computing devices (e.g., a smart phone $102_{10}$, a tablet $102_{11}$, a WiFi phone $102_{12}$, a laptop $102_{13}$, a workstation $102_{14}$, etc.) having software (e.g., a document creation app $210_5$, etc.) and hardware (e.g., a graphics processing unit, display, monitor, etc.) capable of processing and displaying information (e.g., web page, graphical user interface, etc.) on a display. The user device $102_{15}$ can further communicate information (e.g., web page request, user activity, electronic files, computer files, etc.) over the wireless network 407, the network 408, and the content delivery network 409. As shown, the user device $102_{15}$ can be operated by a user collaborator such as user $123_3$. As shown, the document creation app $210_5$ can comprise instances of the earlier described native OS app code (e.g., native OS app code $214_5$), native OS interface (e.g., native OS interface $312_4$), and/or web content viewer (e.g., web content viewer $212_5$). In some cases, certain operations of the document creation app $210_5$ can be facilitated by processing on the application server 153. For example, certain portions of the action parameters (e.g., web content viewer action parameters 343) sent to the web content viewer $212_5$ might be transformed into HTML content at the application server 153 for rendering by the web content viewer $212_5$.

As shown, certain components (e.g., the native OS app code $214_5$, the web content viewer $212_5$) of the document creation app $210_5$ on the user device $102_{15}$, the collaboration server 152, the application server 153, and the storage devices 302 can exhibit a set of high-level interactions (e.g., operations, messages, etc.) in a protocol 420. Specifically, as shown, the application server 153 can provide the document creation app $210_5$ for installation on the user device $102_{15}$ (see message $422_1$). When the app is installed, the user $123_3$ can launch the app to create a new document (see operation $424_1$). For example, the user $123_3$ might create a document (e.g., shared document) that can be shared among authorized collaborators. The user $123_3$ might begin creating content for the shared document by entering some text to be received at an editing surface of the web content viewer $212_5$ (see operation $426_1$). Such document text might be forwarded to the application server 153 (see message $428_1$) and/or to the collaboration server 152 (see message $428_2$) and/or the storage devices 302 (see message $428_3$) to facilitate collaboration.

As highlighted in the protocol 420, a grouping 410 can represent one embodiment of certain messages and operations used in systems and protocols for creating shared content in a device-independent content editor using a native operating system interface. Specifically, such a grouping of interactions might commence with the user $123_3$ interacting with the document creation app $210_5$ to invoke access to a native OS resource (e.g., native camera app) to insert a content object into the shared document (see operation 430). The native OS app code $214_5$ handling the native resource access might use the native OS interface $312_4$ to alert the web content viewer $212_5$ of an incoming object (see message 432). The web content viewer $212_5$ can respond by issuing a request for a placeholder for the incoming object in the shared document to the application server 153 (see message 434). The application server 153 can then create the placeholder (see operation 436) for the web content viewer $212_5$ (see message 438). For example, the object placeholder might be an HTML element comprising a repeating animated GIF file (e.g., "spinner").

When the content object to be inserted is selected in an object selection operation invoked by the native OS app code $214_5$ (see operation 440), the content object can be uploaded to the collaboration server 152 (see message $442_1$). For example, the content object might be uploaded to the collaboration server 152 to facilitate efficient sharing and/or collaboration associated with the content object and/or the shared document comprising the content object. Specifically, the collaboration server 152 might store the content object in the storage devices 302 (see message $442_2$). The native OS app code $214_5$ might then use the native OS interface $312_4$ to communicate to the web content viewer $212_5$ that the content object upload is complete (see message 444). In some embodiments, the web content viewer $212_5$ can respond by requesting a link to the content object when it is available (see message 446). For example, such an object link can be used to access the content object without the additional process of manually downloading, storing, and/or managing a local copy of the content object on the user device $102_{15}$. In one or more embodiments, the collaboration server 152 can generate the object link (see operation 448) to be forwarded to the application server 153 (see message 450). The application server 153 can create a link element comprising the object link to replace the placeholder (see operation 452) such that the web content viewer $212_5$ can use the link element (see message 454) to issue a request for the content object (see message 456). For example, the object link can be a URL call to the content object location in the storage devices 302 such that an instance of the content object (see message $442_3$) is delivered to the web content viewer $212_5$ for rendering in the shared document. When the content object is rendered, the web content viewer $212_5$ can use the native OS interface $312_4$ to communicate to the native OS app code $214_5$ that the content object insertion is complete (see message 458).

The protocol 420 and the grouping 410 are merely one embodiment of certain messages and operations used in systems and protocols for creating shared content in a device-independent content editor using a native operating system interface. Another exemplary embodiment is discussed as pertains to FIG. 5.

Figure 5:
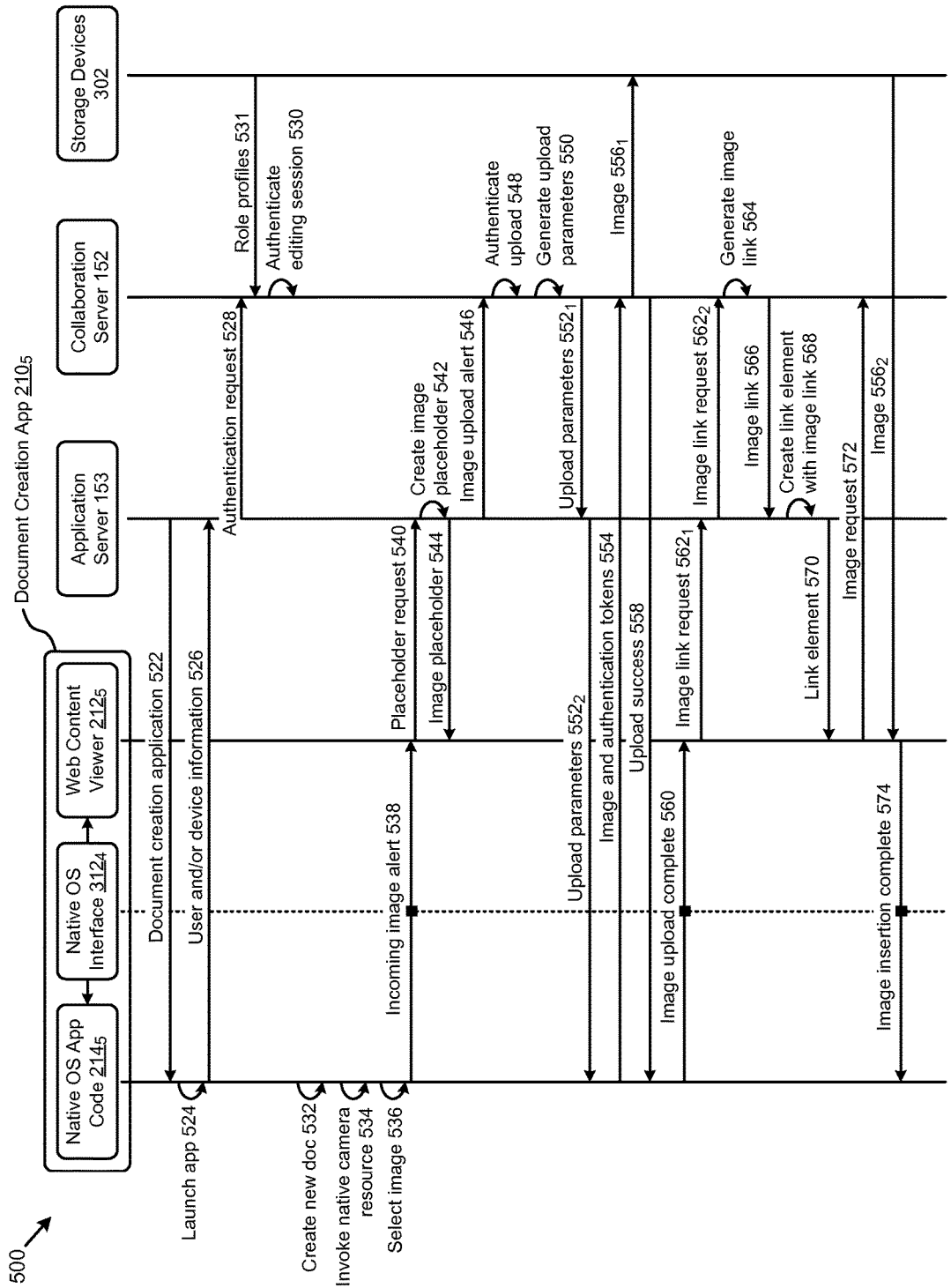
FIG. 5 depicts a protocol observed by system components when creating shared content in a device-independent content editor using a native operating system interface, according to some embodiments.

FIG. 5 depicts a protocol 500 observed by system components when creating shared content in a device-independent content editor using a native operating system interface. As an option, one or more variations of protocol 500 or any aspect thereof may be implemented in the context of the architecture and functionality of the embodiments described herein. Also, the protocol 500 or any aspect thereof may be implemented in any environment.

As shown in FIG. 5, the protocol 500 can be implemented by certain components and systems earlier described in FIG. 4 and herein. Specifically depicted are the native OS app code $214_5$, the native OS interface $312_4$, and the web content viewer $212_5$ of the document creation app $210_5$. Also depicted are the application server 153, the collaboration server 152, and the storage devices 302. As further shown, the foregoing components and systems can exhibit a set of high-level interactions (e.g., operations, messages, etc.) in the protocol 500. Specifically, the application server 153 can provide the document creation app $210_5$ (see message 522) that can be launched using the native OS app code $214_5$ (see operation 524). When the document creation app $210_5$ is launched, a set of user and/or device information (e.g., user login credentials, device ID, etc.) can be sent to the application server 153 (see message 526). The application server 153 might forward such information in an authentication request to the collaboration server 152 (see message 528). The collaboration server 152 can use the received information to authenticate (or not authenticate) the editing session (see operation 530). For example, the authentication might verify the user and/or device information in comparison to the role profiles (e.g., role profiles 127) stored on the storage devices 302 (see message 531).

When the authentication is complete, the document creation app $210_5$ can be used to create a new document (see operation 532). For example, a user might create a document (e.g., shared document) that can be shared among authorized collaborators. The user can further interact with the document creation app $210_5$ to invoke access to a native camera resource from the native OS app code $214_5$ (see operation 534). For example, the native camera resource might be used to insert a photograph and/or image into the shared document. Using the native camera resource, an image can be selected (e.g., photographed and selected, selected from local storage, etc.) in an object selection operation invoked by the native OS app code $214_5$ (see operation 536). The native OS app code $214_5$ handling the native camera resource might use the native OS interface $312_4$ to alert the web content viewer $212_5$ of an incoming image (see message 538). Such an alert might comprise information relating to various attributes associated with the image, such as an identifier (e.g., filename), a size, a set of dimensions, and/or other attributes. The web content viewer $212_5$ can respond by issuing a request for a placeholder for the incoming image in the shared document to the application server 153 (see message 540). The application server 153 can then create the image placeholder (see operation 542) for the web content viewer $212_5$ (see message 544). For example, the image placeholder might be an HTML element comprising a repeating animated GIF file (e.g., "spinner"). The application server 153 can further issue an alert to the collaboration server 152 that an image upload is forthcoming (see message 546). Such an alert might comprise one or more of the aforementioned image attributes delivered by the native OS app code $214_5$.

In some cases, the collaboration server 152 might authenticate the upload request using, for example, credentials provided by the document creation app $210_5$ and/or the application server 153 in the upload alert message (see operation 548). In other cases, the collaboration server 152 can use the authentication earlier established (see operation 530) to authenticate the upload. The collaboration server 152 might further generate certain upload parameters in preparation for the image upload (see operation 550). For example, a folder identifier might be established to represent the location (e.g., on the storage devices 302) where the uploaded image will be stored. Such upload parameters can be sent to the application server 153 (see message $552_1$) and forwarded (see message $552_2$) to the native OS app code $214_5$ communicating with the native camera resource. The image and, in some cases, certain authentication tokens (e.g., to complete the authentication handoff), can be uploaded using the native OS app code $214_5$ to the collaboration server 152 (see message 554). For example, the image might be uploaded to the collaboration server 152 to facilitate efficient sharing and/or collaboration associated with the image and/or the shared document comprising the image. Specifically, the collaboration server 152 might store the image in the storage devices 302 (see message $556_1$). The collaboration server 152 might further issue an upload success message to the native OS app code $214_5$ (see message 558). The native OS app code $214_5$ might then use the native OS interface $312_4$ to communicate to the web content viewer $212_5$ that the image upload is complete (see message 560). In some embodiments, the web content viewer $212_5$ can respond issuing a request to the application server 153 for a link to the image when it becomes available (see message $562_1$). The application server 153 can then forward the request to the collaboration server 152 (see message $562_2$). The collaboration server 152 can generate the image link (see operation 564) to be forwarded to the application server 153 (see message 566). The application server 153 can create a link element comprising the image link (see operation 568) to replace the placeholder such that the web content viewer $212_5$ can use the link element (see message 570) to issue a request for the image (see message 572). For example, the image link can be a URL call to the image location (e.g., folder-ID://filename) in the storage devices 302 such that an instance of the image (see message $556_2$) is delivered to the web content viewer $212_5$ for rendering in the shared document. When the image is rendered, the web content viewer $212_5$ can use the native OS interface $312_4$ to communicate to the native OS app code $214_5$ that the image insertion is complete (see message 574).

Figure 6A:
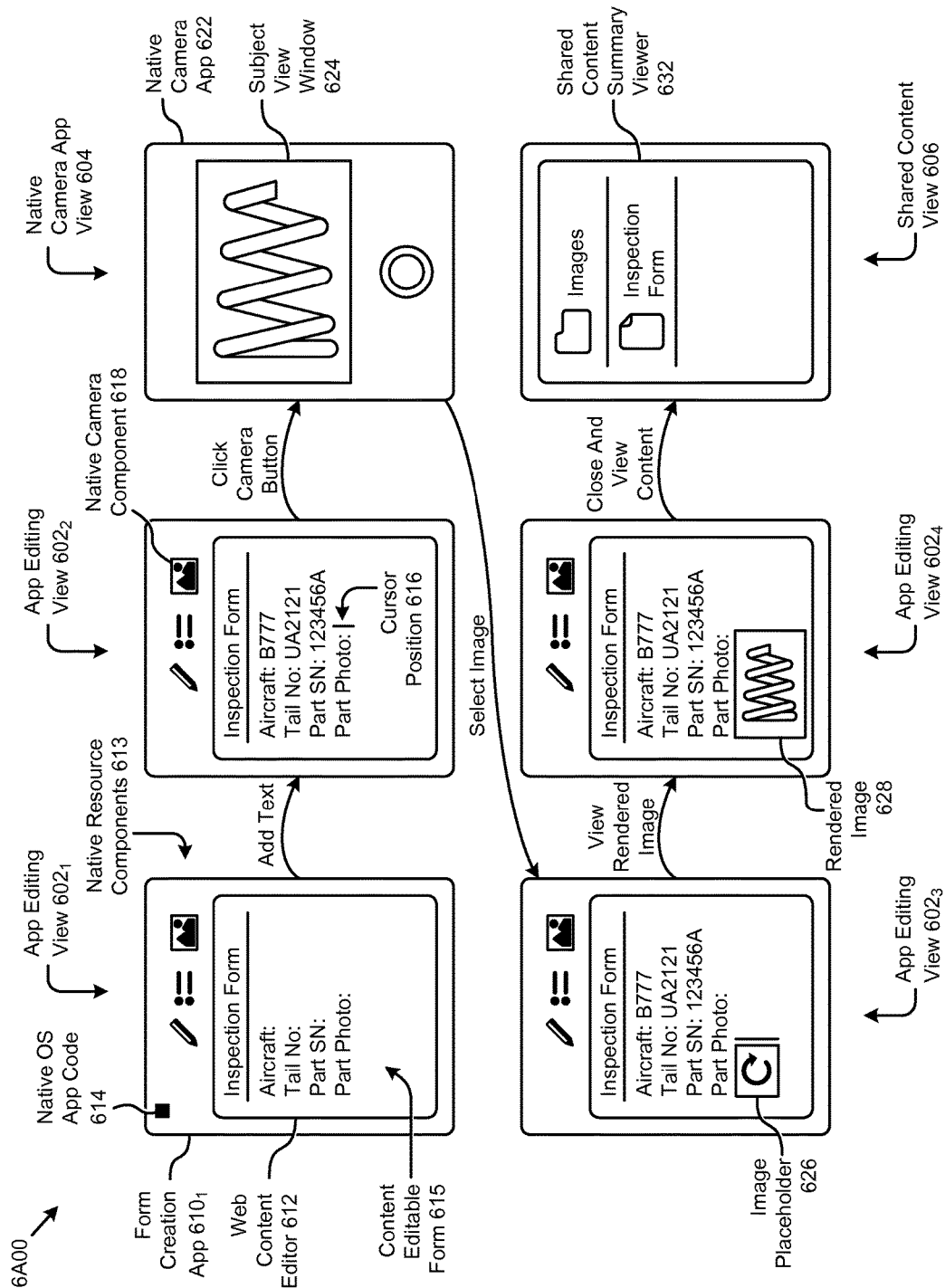
FIG. 6A illustrates a form generation technique as used in systems for creating shared content in a device-independent content editor using a native operating system interface, according to some embodiments.

FIG. 6A illustrates a form generation technique 6A00 as used in systems for creating shared content in a device-independent content editor using a native operating system interface. As an option, one or more variations of form generation technique 6A00 or any aspect thereof may be implemented in the context of the architecture and functionality of the embodiments described herein. Also, the form generation technique 6A00 or any aspect thereof may be implemented in any environment.

The form generation technique 6A00 depicts a sequence of views of a form creation app $610_1$ used by a user (e.g., creator collaborator $125_1$) to create shared content (e.g., an inspection form) according to the herein disclosed techniques. Specifically, in an app editing view $602_1$, the form creation app $610_1$ is shown to comprise a web content viewer 612 comprising a content editable form 615. In some cases and/or embodiments, the web content viewer 612 and a content editing surface presenting the content editable form 615 might comprise a device-independent content editor. For example, the web content viewer 612 might implement an iOS UIWebView (e.g., or WKWebView) object and the content editing surface might be formed by a contentEditable container such that the content editable form 615 can be represented in HTML for compatibility across device platforms. The form creation app further comprises a set of native resource components 613 (e.g., a camera button, a bullet and/or list formatting button, and a stylus button) providing an interface to invoke access to certain resources native to the OS (e.g., a camera, a style control, and a stylus, respectively). In some cases, such native OS resource access can be implemented by certain instances of native OS app code 614 included in the form creation app $610_1$.

As illustrated by the form generation technique 6A00, the app editing view $602_1$ shows certain form content (e.g., field labels) that might be preloaded into the created inspection form. In some cases, such preloaded content can be based on the role profile of the user. For example, the role profile of a given user might identify the user as a technician (e.g., aircraft repair technician) authorized to complete certain portions of a custom inspection form designed by the enterprise (e.g., airline) employing the technician. In such cases, the form creation app $610_1$ can preload certain static portions (e.g., field labels) of the custom inspection form when a new form creation operation is invoked by the technician. Further, as shown, an app editing view $602_2$ might result from certain text being entered by the user into the content editable form 615. For example, the shown text input (e.g., B777, UA2121, and 123456A) might be entered by the user for the corresponding fields (e.g., Aircraft, Tail No., and Part SN, respectively). When done entering the foregoing text, the user might also position the cursor at a cursor position 616 in preparation for inserting a picture at the cursor position 616. For example, the technician might need to take a picture of a repaired part as evidence of a completion of the repair. As implemented by the herein disclosed techniques, the user can click the camera button (e.g., native camera component 618) to invoke a native camera app 622 as shown in a native camera app view 604. The user might then use a subject view window 624 to take a photograph and select the resulting image. When the image is selected, an image placeholder 626 can be inserted in the content editing surface $215_1$ at the cursor position 216 as shown in an app editing view $602_3$. In one or more embodiments, the image placeholder 626 can be used to identify the intended insertion point of the image while the image is processed. For example, the image might be uploaded to a cloud-based shared content management system to facilitate collaboration operations associated with the image and/or created form (e.g., see FIG. 4 and/or FIG. 5). In such cases, the selected image might not be immediately accessible.

When the selected image is accessible, the user can view the rendered image 628 in an app editing view $602_4$. In some cases, the form creation app $610_1$ can be closed by the user to view a summary of the created shared content. Specifically, a document named "Inspection Form" and a folder named "Images" (e.g., comprising the stored copy of the rendered image 628) can be viewed in a shared content summary viewer 632 in a shared content view 606. According to the herein disclosed techniques, such created content can be shared in real time with authorized collaborators, as discussed in FIG. 6B.

Figure 6B:
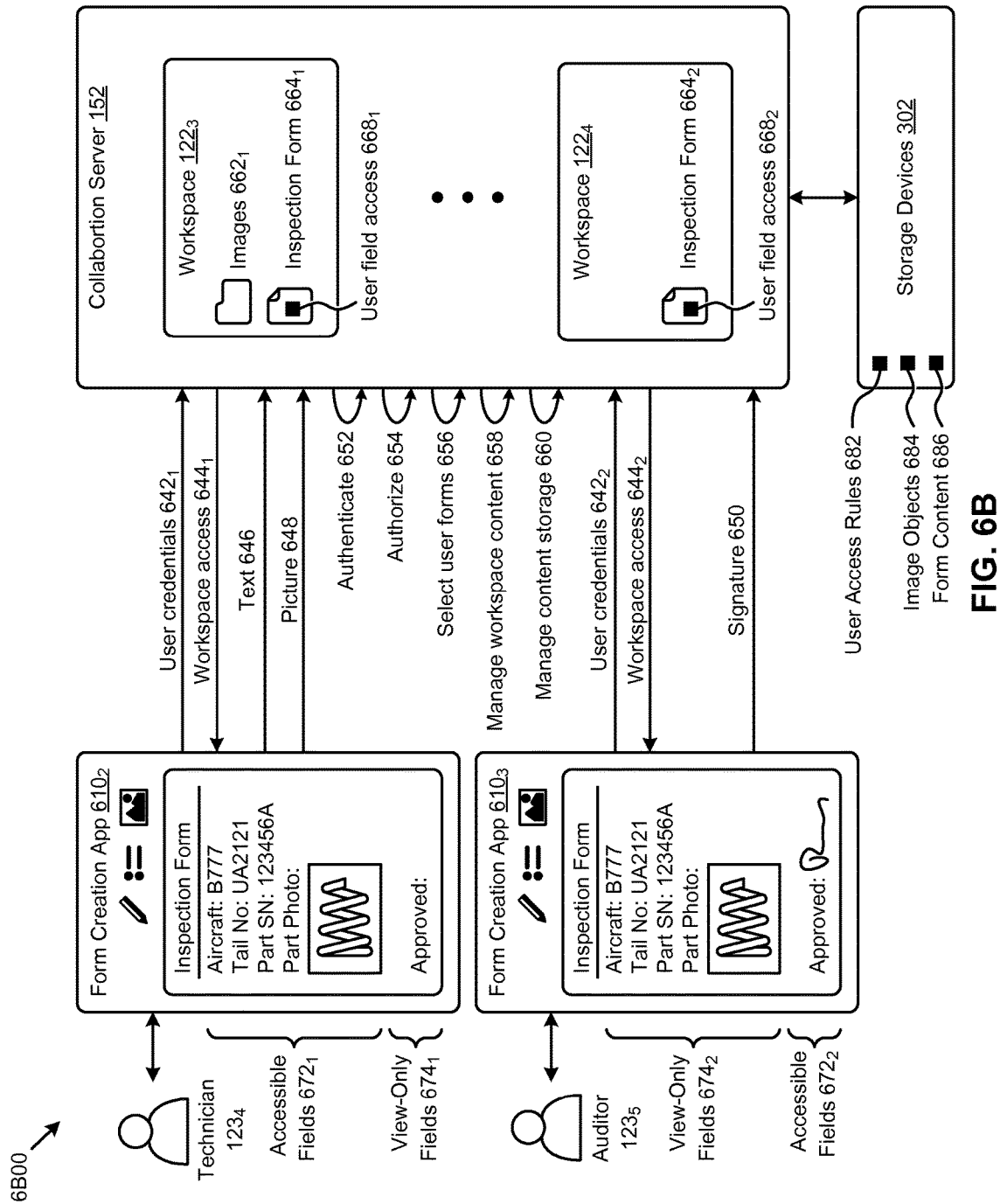
FIG. 6B is a diagram illustrating a content sharing technique as used in systems for creating shared content in a device-independent content editor using a native operating system interface, according to some embodiments.

FIG. 6B is a diagram illustrating a content sharing technique 6B00 as used in systems for creating shared content in a device-independent content editor using a native operating system interface. As an option, one or more variations of content sharing technique 6B00 or any aspect thereof may be implemented in the context of the architecture and functionality of the embodiments described herein. Also, the content sharing technique 6B00 or any aspect thereof may be implemented in any environment.

As depicted in FIG. 6B, the content sharing technique 6B00 can be illustrated by the interactions of certain users (e.g., technician $123_4$ and auditor $123_5$) with instances of the form creation app $610_1$ (e.g., form creation app $610_2$ and form creation app $610_3$) described in FIG. 6A. For example, the users might be collaborating on an instance of the content editable form 615 further described in FIG. 6A. The content sharing technique 6B00 can be further described by certain interactions (e.g., messages, operations, etc.) among the form creation app $610_2$, the form creation app $610_3$, and the collaboration server 152 described herein.

Specifically, the technician $123_4$ can launch the form creation app $610_2$ and provide a set of user credentials to the collaboration server 152 (see message $642_1$). The collaboration server 152 can authenticate (see operation 652) and/or authorize (see operation 654) the user to provision access to a workspace $122_3$ (see message $644_1$) that may include images $662_1$ and/or depictions inspection forms. In some cases, the collaboration server 152 can use the user credentials and/or other information (e.g., role profiles) to select a form (e.g., an inspection form $664_1$) to load into the form creation app $610_2$ (see operation 656). The auditor $123_5$ might also launch the form creation app $610_3$ and provide a set of user credentials to the collaboration server 152 (see message $642_2$). The collaboration server 152 can authenticate (see operation 652) and/or authorize (see operation 654) the user to provision access to a workspace $122_4$ (see message $644_2$). The workspaces (e.g., workspace $122_3$ and workspace $122_4$) allow the users to access shared content from the collaboration server 152 without the additional process of manually downloading and storing a file locally. For example, the collaboration server 152 might store certain shared content (e.g., form content 686, image objects 684, etc.) in the storage devices 302 for viewing by authorized collaborators, yet without informing the collaborators where the file is stored and/or without prompting the collaborators for a directory in which to access the file. Such a facility streamlines the frequently repeated sharing and collaboration processes.

In some cases, the collaboration server 152 can use the user credentials and/or other information (e.g., user access rules 682) to manage the content to be presented in the workspace for a given user (see operation 658). For example, the technician $123_4$ is provisioned access in workspace $122_3$ to the inspection form $664_1$ created by the technician $123_4$ as well as a folder of images (e.g., comprising the one or more images associated with the inspection form $664_1$). Further, the auditor $123_5$ is provisioned access in workspace $122_4$ to an instance of the inspection form $664_1$ created by the technician $123_4$ (e.g., inspection form $664_2$). The user access rules 682 might also be used by the collaboration server 152 to determine access to certain fields in a given form. Specifically, a user field access $668_1$ might identify a set of accessible fields $672_1$ and/or a set of view-only fields $674_1$ associated with the technician $123_4$. Further, a user field access $668_2$ might identify a set of accessible fields $672_2$ and/or a set of view-only fields $674_2$ associated with the auditor $123_5$. For example, the user field access $668_1$ might allow the technician $123_4$ to enter text (see message 646) and pictures (see message 648) into the form, yet not allow the technician $123_4$ to sign the form. In comparison, the user field access $668_2$ might allow the auditor $123_5$ to sign the form (see message 650), yet not allow the auditor $123_5$ to enter text and/or pictures into the form. In some cases, such user field access rules and the corresponding field access provisioning can be used to comply with certain regulatory and/or compliance policies. For example, the interactions illustrated in the content sharing technique 6B00, where evidence of a repair (e.g., provided by technician $123_4$) is shared for approval by a third party (e.g., auditor $123_5$), might satisfy some aviation safety regulation.

Figure 7:
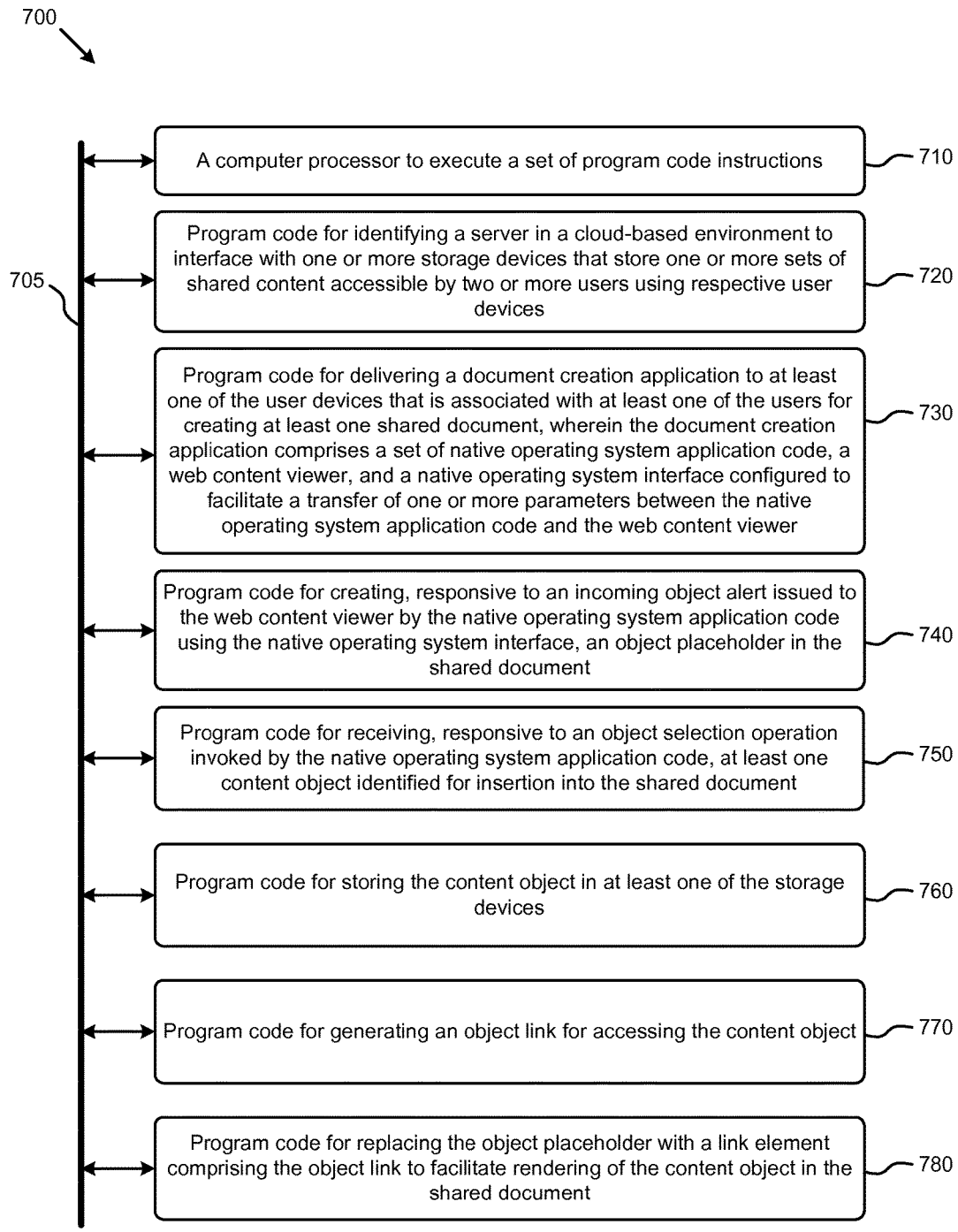
FIG. 7 depicts system components as arrangements of computing modules that are interconnected so as to implement certain of the herein-disclosed embodiments.

Additional Embodiments of the Disclosure
Additional Practical Application Examples FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the present system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (see module 710) and modules for accessing memory to hold program code instructions to perform: identifying a server in a cloud-based environment to interface with one or more storage devices that store one or more sets of shared content accessible by two or more users using respective user devices (see module 720); delivering a document creation application to at least one of the user devices that is associated with at least one of the users for creating at least one shared document, wherein the document creation application comprises a set of native operating system application code, a web content viewer, and a native operating system interface configured to facilitate a transfer of one or more parameters between the native operating system application code and the web content viewer (see module 730); creating, responsive to an incoming object alert issued to the web content viewer by the native operating system application code using the native operating system interface, an object placeholder in the shared document (see module 740); receiving, responsive to an object selection operation invoked by the native operating system application code, at least one content object identified for insertion into the shared document (see module 750); storing the content object in at least one of the storage devices (see module 760); generating an object link for accessing the content object (see module 770); and replacing the object placeholder with a link element comprising the object link to facilitate rendering of the content object in the shared document (see module 780). A web protocol is initiated to send all or a portion of an instance of the shared document to the user device.

Variations of the foregoing include:
variations where the web content viewer comprises a content editing surface configured to operate on a plurality of user device operating systems;
variations further comprising receiving, responsive to replacing the object placeholder with a link element, a content object request;
variations further comprising delivering, responsive to receiving the content object request, the content object for rendering of the content object in the shared document;
variations further comprising inserting the object placeholder in the shared document at a cursor position;
variations further comprising generating, responsive to the object selection operation invoked by the native operating system application code, one or more upload parameters;
variations further comprising delivering at least one of the upload parameters to the document creation application;
variations where the upload parameters comprise at least one of, a folder identifier, a storage location, or an authentication token;
variations where the parameters associated with the incoming object alert comprise at least one of, an object identifier, an object size, or an object dimension; and
variations where replacing the object placeholder with the link element is responsive to an upload complete alert that was issued to the web content viewer by the native operating system application code (e.g., using the native operating system interface).

Of course the foregoing variations are merely examples. Other embodiments are possible without departing from the scope of the disclosure.

System Architecture Overview
Additional System Architecture Examples

Figure 8A:
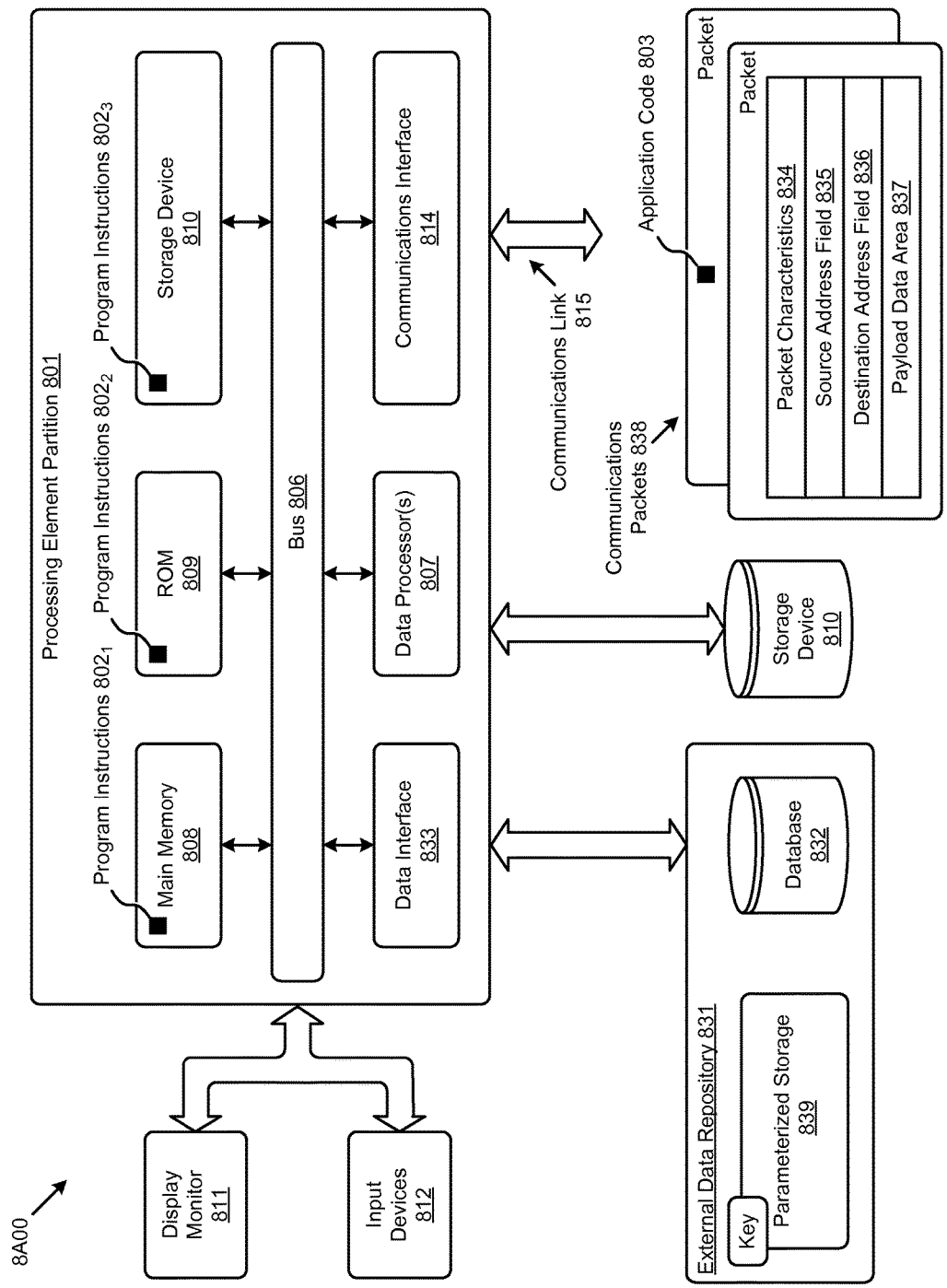
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal or external storage device 810 (e.g., magnetic or optical), a data interface 833, a communications interface 814 (e.g., PHY, MAC, Ethernet interface, modem, etc.). The aforementioned computing components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets 838). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics of techniques for creating shared content in a device-independent content editor using a native operating system interface.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of creating shared content in a device-independent content editor using a native operating system interface). Such files or records can be brought into and/or stored in volatile or non-volatile memory.

Figure 8B:
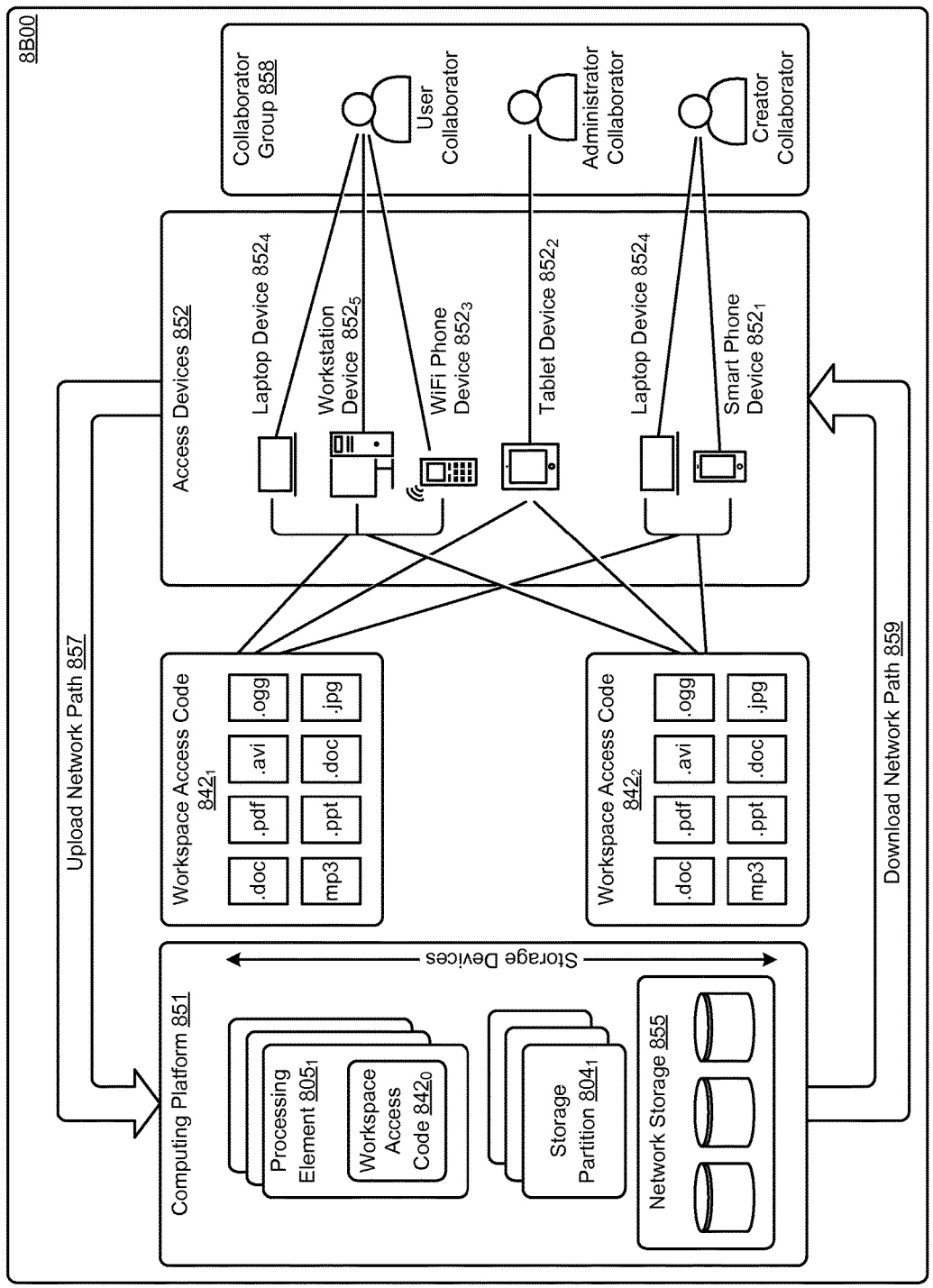

FIG. 8B depicts a block diagram of an instance of a cloud-based environment 8B00. Such a cloud-based environment supports access to workspaces through the execution of workspace access code (e.g., workspace access code 842$_0$, workspace access code 842$_1$, and workspace access code 842$_2$) Workspace access code can be executed on any of the shown access devices 852 (e.g., laptop device 852$_4$, workstation device 852$_5$, WiFi phone device 852$_3$, tablet device 852$_2$, smart phone device 852$_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 851, including in a middleware setting. As shown, a portion of the workspace access code resides in and can be executed on one or more processing elements (e.g., processing element 805$_1$). The workspace access code can interface with storage devices such the shown networked storage 855. Storage of workspaces and/or any constituent files or objects, and/or any other code or scripts or data can be stored in any one or more storage partitions (e.g., storage partition 804$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying a server in a cloud-based environment that interfaces with one or more storage devices that store one or more sets of shared content accessible by one or more users using respective user devices;
   delivering a document editing application to at least one of the user devices that is associated with at least one of the users to create at least one shared document, wherein the document editing application comprises a set of native operating system application code, a web content viewer, and a native operating system interface configured to facilitate a transfer of one or more objects between the native operating system application code and the web content viewer;
   creating, responsive to an incoming object alert issued to the web content viewer by the native operating system application code, an object placeholder in the shared document;
   receiving, responsive to an object selection operation invoked by the native operating system application code, at least one content object identified to be inserted into the shared document;
   storing the content object in at least one of the storage devices;
   generating an object link to access the content object; and
   replacing the object placeholder with a link element comprising the object link to facilitate rendering of the content object in the shared document.

2. The method of claim 1, wherein the web content viewer comprises a content editing surface configured to operate on a plurality of user device operating systems.

3. The method of claim 1, further comprising receiving, responsive to replacing the object placeholder with a link element, a content object request.

4. The method of claim 3, further comprising delivering, responsive to receiving the content object request, the content object to render of the content object in the shared document.

5. The method of claim 1, further comprising inserting the object placeholder in the shared document at a cursor position.

6. The method of claim 1, further comprising generating, responsive to the object selection operation invoked by the native operating system application code, one or more upload parameters.

7. The method of claim 6, further comprising delivering at least one of the upload parameters to the document editing application.

8. The method of claim 6, wherein the upload parameters comprise at least one of, a folder identifier, a storage location, or an authentication token, or any combination thereof.

9. The method of claim 1, wherein the upload parameters that are associated with the incoming object alert comprise at least one of, an object identifier, an object size, or an object dimension, or any combination thereof.

10. The method of claim 1, wherein replacing the object placeholder with the link element is responsive an upload complete alert issued to the web content viewer by the native operating system application code using the native operating system interface.

11. A computer program product, embodied in a non-transitory computer readable medium, the non-transitory computer readable medium having stored thereon a sequence of instructions which, when stored in memory and executed by a processor causes the processor to perform a set of acts, the acts comprising:
    identifying a server in a cloud-based environment that interfaces with one or more storage devices that store one or more sets of shared content accessible by one or more users using respective user devices;
    delivering a document editing application to at least one of the user devices that is associated with at least one of the users to create at least one shared document, wherein the document editing application comprises a set of native operating system application code, a web content viewer, and a native operating system interface configured to facilitate a transfer of one or more objects between the native operating system application code and the web content viewer;
    creating, responsive to an incoming object alert issued to the web content viewer by the native operating system application code, an object placeholder in the shared document;
    receiving, responsive to an object selection operation invoked by the native operating system application code, at least one content object identified to be inserted into the shared document;
    storing the content object in at least one of the storage devices;
    generating an object link to access the content object; and
    replacing the object placeholder with a link element comprising the object link to facilitate rendering of the content object in the shared document.

12. The computer program product of claim 11, wherein the web content viewer comprises a content editing surface configured to operate on a plurality of user device operating systems.

13. The computer program product of claim 11, further comprising instructions which, when stored in memory and executed by a processor causes the processor to perform acts of receiving, responsive to replacing the object placeholder with a link element, a content object request.

14. The computer program product of claim 13, further comprising instructions which, when stored in memory and executed by a processor causes the processor to perform acts of delivering, responsive to receiving the content object request, the content object to render of the content object in the shared document.

15. The computer program product of claim 11, further comprising instructions which, when stored in memory and executed by a processor causes the processor to perform acts of inserting the object placeholder in the shared document at a cursor position.

16. The computer program product of claim 11, further comprising instructions which, when stored in memory and executed by a processor causes the processor to perform acts of generating, responsive to the object selection operation invoked by the native operating system application code, one or more upload parameters.

17. The computer program product of claim 16, further comprising instructions which, when stored in memory and executed by a processor causes the processor to perform acts of delivering at least one of the upload parameters to the document editing application.

18. The computer program product of claim 11, wherein the upload parameters that are associated with the incoming object alert comprise at least one of, an object identifier, an object size, or an object dimension, or any combination thereof.

19. A system comprising:
   a server in a cloud-based environment that interfaces with one or more storage devices that store one or more sets of shared content accessible by one or more users using respective user devices; and
   one or more computing components that operate individually or collectively to perform acts of,
      delivering a document editing application to at least one of the user devices that is associated with at least one of the users to create at least one shared document, wherein the document editing application comprises a set of native operating system application code, a web content viewer, and a native operating system interface configured to facilitate a transfer of one or more objects between the native operating system application code and the web content viewer;
      creating, responsive to an incoming object alert issued to the web content viewer by the native operating system application code, an object placeholder in the shared document;
      receiving, responsive to an object selection operation invoked by the native operating system application code, at least one content object identified to be inserted into the shared document;
      storing the content object in at least one of the storage devices;
      generating an object link to access the content object; and
      replacing the object placeholder with a link element comprising the object link to facilitate rendering of the content object in the shared document.

20. The system of claim 19, wherein the web content viewer comprises a content editing surface configured to operate on a plurality of user device operating systems.

* * * * *